United States Patent
Rousset et al.

(10) Patent No.: US 12,327,701 B2
(45) Date of Patent: Jun. 10, 2025

(54) PYROTECHNIC CIRCUIT BREAKER ASSEMBLY FOR AN AIRCRAFT, AND AN AIRCRAFT COMPRISING SUCH AN ASSEMBLY

(71) Applicant: Airbus Operations SAS, Toulouse (FR)

(72) Inventors: David Rousset, Toulouse (FR); Jean-Marc Lacoste, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 178 days.

(21) Appl. No.: 17/851,391

(22) Filed: Jun. 28, 2022

(65) Prior Publication Data

US 2023/0005684 A1 Jan. 5, 2023

(30) Foreign Application Priority Data

Jun. 30, 2021 (FR) ...................................... 2107084

(51) Int. Cl.
*H01H 39/00* (2006.01)
*B64D 27/24* (2006.01)
*B64D 47/00* (2006.01)
*H02H 1/00* (2006.01)
*H02H 3/08* (2006.01)

(52) U.S. Cl.
CPC .......... *H01H 39/006* (2013.01); *B64D 27/24* (2013.01); *B64D 47/00* (2013.01); *H02H 1/0007* (2013.01); *H02H 3/08* (2013.01)

(58) Field of Classification Search
CPC .. H01H 39/00–2039/008; B64D 27/24; B64D 47/00; H02H 1/0007; H02H 3/08
See application file for complete search history.

(56) References Cited

U.S. PATENT DOCUMENTS

| | | | |
|---|---|---|---|
| 11,152,175 B2 * | 10/2021 | Koprivsek | ............. H01H 39/00 |
| 2010/0328014 A1 * | 12/2010 | Suzuki | ................ H01H 39/006 |
| | | | 337/30 |
| 2013/0126326 A1 | 5/2013 | Borg | |

(Continued)

FOREIGN PATENT DOCUMENTS

| EP | 3525223 A1 | 8/2019 |
|---|---|---|
| FR | 2953322 A1 | 6/2011 |

(Continued)

OTHER PUBLICATIONS

French Search Report; priority document.

*Primary Examiner* — Jacob R Crum
(74) *Attorney, Agent, or Firm* — Greer, Burns & Crain, Ltd.

(57) ABSTRACT

An electrical circuit breaker assembly, and a method for its operation, including a conductive element of an electrical circuit and a cut-off device configured to be activated by a pyrotechnic element and that is configured to sever the conductive element in a cut-off zone delimited by a downstream point. The electrical circuit breaker assembly further includes a contactor element configured to be activated by a pyrotechnic element, the contactor element being configured to connect the downstream point of the cut-off zone to an earth conductor of the electrical circuit prior to a severing of the conductive element or simultaneously with the severing of the conductive element.

7 Claims, 9 Drawing Sheets

(56) References Cited

U.S. PATENT DOCUMENTS

| | | | |
|---|---|---|---|
| 2016/0343531 A1* | 11/2016 | Douglass | H01H 85/143 |
| 2018/0294130 A1* | 10/2018 | Doerr | H01H 39/004 |
| 2019/0184834 A1* | 6/2019 | Hammerschmidt | H01H 39/00 |
| 2019/0287751 A1 | 9/2019 | Gontheir et al. | |
| 2021/0384718 A1* | 12/2021 | Rosado | H02H 7/268 |
| 2021/0391136 A1* | 12/2021 | Viertler | G01R 27/08 |

FOREIGN PATENT DOCUMENTS

| | | | |
|---|---|---|---|
| FR | 2953324 A1 | 6/2011 | |
| FR | 3051282 A1 | 11/2017 | |
| FR | 3088592 A1 | 5/2020 | |

* cited by examiner

PYROTECHNIC CIRCUIT BREAKER ASSEMBLY FOR AN AIRCRAFT, AND AN AIRCRAFT COMPRISING SUCH AN ASSEMBLY

CROSS-REFERENCES TO RELATED APPLICATIONS

This application claims the benefit of the French patent application No. 2107084 filed on Jun. 30, 2021, the entire disclosures of which are incorporated herein by way of reference.

FIELD OF THE INVENTION

The present invention relates to a system and a method for protecting electrical circuits. The invention more particularly relates to an electrical circuit breaker assembly capable of isolating a faulty electrical line in an electrical circuit of an aircraft. The invention also relates to an aircraft comprising such an electrical circuit breaker assembly.

BACKGROUND OF THE INVENTION

Electrical power requirements on board an aircraft are constantly increasing, leading to the voltage levels of the electrical sources needing to be increased in order to maintain acceptable current levels for transporting energy between a source and the consuming devices that are connected to it. In the event of an incident on an electrical line, and of an abnormal increase in the current in this line, the line should be isolated to prevent the fault propagating to other elements of the electrical circuit. The means usually used to do this no longer satisfy the specificities of use on board an aircraft, on account of the increasingly high voltages and currents used. For the purpose of isolating a faulty electrical line, electrical protections comprising a pyrotechnic element are used in the automotive industry. The benefit of the pyrotechnic element is that it makes it possible to act very quickly. These systems use a current sensor that is configured to measure the current consumed in an electrical line such that, when a sudden and significant increase in the current is detected, a control module activates an actuator of a circuit breaker assembly arranged on the current line, physically severing the current line. The actuator is activated by a pyrotechnic element, which gives the short-circuit assembly a very short activation time and consequently makes it possible to quickly isolate the faulty electrical line from the rest of the electrical circuit before the fault propagates.

Equivalent devices exist in aircraft, such as, for example, remote control circuit breakers, sometimes abbreviated to RCCB, which are electromechanical, or else solid state power controllers, sometimes abbreviated to SSPC. These devices typically perform functions of protecting cables or power supply buses, or else of switching loads, of detecting electric arcs, etc.

It is known that opening a circuit through which a current is flowing can generate significant overvoltages due to the inductive nature of the circuit. Such an overvoltage, when an electrical power supply line is opened, is all the higher since the inductance of the electrical line is large and parasitic capacitances are small. The overvoltage across the terminals of an opening point of a power supply line can lead to destruction of elements of the circuit. Very often, the majority of the energy stored in an electrical line is dissipated in the breaking arc when the line is opened. The rest of the energy is dissipated in the rest of the electrical circuit, thus constituting a fault that is detrimental to the integrity of the latter.

The significant increase in the voltage used by aircraft energy sources is such that the volume, weight and cost characteristics of certain elements of the electrical circuits no longer satisfy the conditions of use on board an aircraft. This is, in particular, due to the observed effects described by Paschen's law. Paschen's law makes it possible to characterize the appearance of an electric arc during the opening of an electrical power supply line as a function of the atmospheric pressure around the point of opening of the electrical line, and therefore as a function of the operating altitude.

The situation can therefore be improved.

SUMMARY OF THE INVENTION

The present invention aims, in particular, to provide an electrical circuit breaker assembly that allows a faulty electrical power supply line in an aircraft to be quickly isolated before the overvoltage present can be transferred to other elements of the electrical circuit comprising this electrical power supply line, while at the same time avoiding having to oversize components of the electrical installation of the aircraft.

To this end, one subject of the invention is an electrical circuit breaker assembly comprising a conductive element of an electrical power supply line of an electrical circuit and a cut-off device that can be activated by a first pyrotechnic element and that is configured to sever the conductive element in a predetermined cut-off zone delimited by a downstream point, the electrical circuit breaker assembly further comprising a contactor element that can be activated by a second pyrotechnic element, the contactor element being configured to connect the downstream point of the predetermined cut-off zone to an earth conductor of the electrical circuit prior to a severing of the conductive element or simultaneously with the severing of the conductive element.

Advantageously, it is thus possible to isolate an electrical power supply line having an electrical fault from the rest of the electrical circuit and thus to limit the propagation of this electrical fault to other elements of the electrical circuit.

The electrical circuit breaker assembly according to the invention may also comprise the following features, considered alone or in combination:

The second pyrotechnic element and the first pyrotechnic element constitute one and the same pyrotechnic element.

The cut-off device and the contactor device form one and the same part or are arranged integrally with each other.

Another subject of the invention is an electrical protection system comprising an overcurrent detector, also called a control module here, and an electrical circuit breaker assembly as mentioned above.

Another subject of the invention is an electrical circuit comprising such an electrical circuit breaker assembly or an electrical protection system comprising such an electrical circuit breaker assembly.

Another subject of the invention is an aircraft comprising an electrical circuit as mentioned above.

According to one embodiment, the aircraft comprises at least one means of electric propulsion.

The invention further relates to a method for protecting an electrical circuit of an aircraft, the electrical circuit comprising a conductive element of a circuit and a cut-off (severing) device that can be activated by a first pyrotechnic element and that is configured to sever the conductive element in a predetermined cut-off zone delimited by a downstream point, the electrical circuit breaker assembly further comprising a contactor device that can be activated by a second pyrotechnic element, the contactor element being configured to connect the downstream point of the cut-off zone to an earth conductor of the electrical circuit, the method comprising steps of:
- (i) detecting a current that is representative of a current greater than a predetermined threshold established in the conductive element,
- (ii) connecting the downstream point of the cut-off zone to an earth conductor of the electrical circuit, and
- (iii) severing said conductive element in a predetermined cut-off zone.

According to one embodiment, step (iii) of severing the conductor is after step (ii) of connecting by contact the downstream point of the cut-off zone to an earth conductor of the electrical circuit.

BRIEF DESCRIPTION OF THE DRAWINGS

The features of the invention that were mentioned hereinabove, as well as others, will become more clearly apparent on reading the following description of at least one exemplary embodiment, said description being given with reference to the attached drawings, among which.

DETAILED DESCRIPTION OF THE PREFERRED EMBODIMENTS

Figure 1:
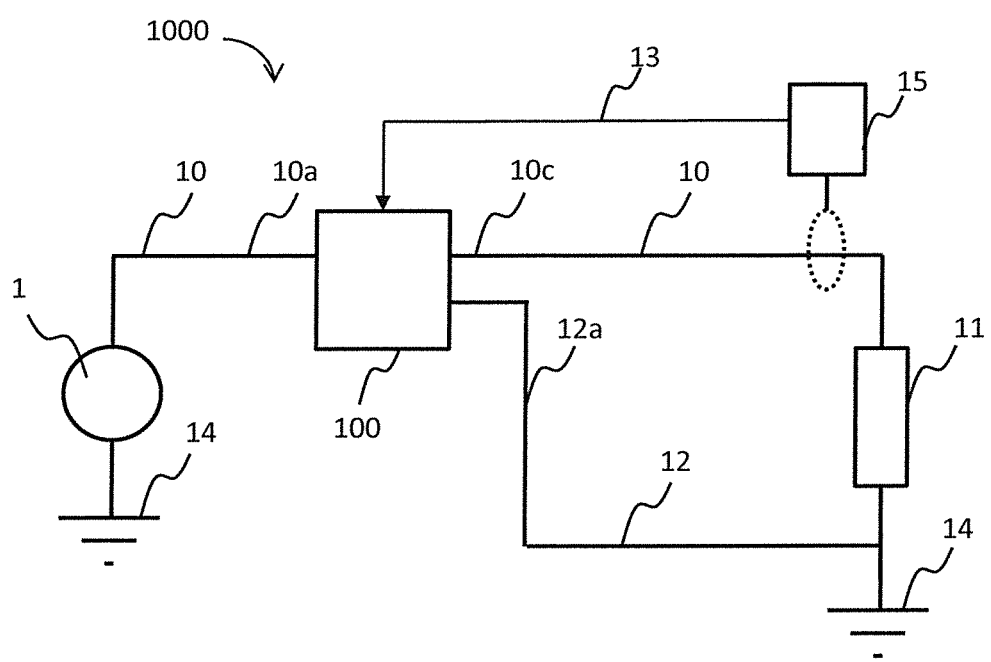
FIG. 1 schematically illustrates a portion of an electrical circuit comprising an electrical circuit breaker assembly arranged between an electrical energy source and an element that consumes electrical energy according to one embodiment.

FIG. 1 schematically shows a portion of an electrical circuit 1000.

According to one embodiment, the electrical circuit 1000 is an electrical circuit of an aircraft. The portion of the electrical circuit 1000 shown comprises an electrical energy source 1 supplying power through an electrical power supply line 10 to an element that consumes electrical energy 11.

The electrical power supply line 10 is therefore a power supply line for supplying electrical energy to the consuming element 11. The element that consumes electrical energy 11 is any electrical device, and is also commonly called a load, receiver or current receiver. The electrical power supply circuit for the element that consumes electrical energy 11 is closed by connection of the electrical energy source 1 to an electrical earth (ground) 14 and connection of the element that consumes electrical energy 11 to the same electrical earth 14. The electrical line 10 comprises an electrical circuit breaker assembly 100 which is configured to be able to, if necessary, quickly open the electrical power supply line 10 at a location, which is predetermined by the physical position of the electrical circuit breaker assembly 100, between the electrical energy source 1 and the element that consumes electrical energy 11. Opening of the electrical power supply line 10 is required, in particular, in the event of an electrical fault being detected, such as, for example, an overcurrent in this electrical power supply line. The electrical circuit breaker assembly 100 is configured to be activated, that is to say to be capable of opening the electrical line 10, in response to at least one control signal carried by a control line 13. The control signal 13 is delivered by a control module 15 that monitors the electric current present and measured in the electrical power supply line 10. The control module 15 acts as a supervisor of the electric current established in the electrical line 10 such that, in the event of overcurrent in the electrical line 10, the control module 15 delivers the activation signal 13 to activate the electrical circuit breaker 100 in order to open the electrical power supply line 10. More precisely, the control module 15 is intended to deliver the activation signal 13 as soon as it detects that the value of the current measured in the electrical power supply line 10 is equal to or greater than a predetermined threshold value. In the present description, the activation signal and the physical medium carrying this signal, that is to say, the control line, are both referenced 13. The control module 15 continuously monitors the electric current present in the electrical power supply line 10.

The circuit breaker assembly 100 is mounted in series on the electrical power supply line 10 between a first point 10a of the electrical line 10, called the "upstream point", and a second point 10c of the electrical line 10, called the "downstream point". The electrical circuit breaker assembly 100 is therefore configured to open the electrical line in a predetermined zone situated between these two points. The term "upstream" is to be interpreted here as meaning arranged on the side of the electrical energy source 1 with respect to an opening point of the electrical power supply line 10, i.e., to the point at which the electrical power supply line is opened in the electrical circuit breaker assembly 100. In contrast, the term "downstream" is to be interpreted as meaning arranged on the side opposite the opening point of the electrical power supply line 10 with respect to the electrical energy source 1, that is to say, arranged on the side of the element that consumes electrical energy 11 with respect to the electrical circuit breaker assembly 100. An earth (ground) conductor 12 connects an electrical earth 14 of the electrical circuit 1000 to the electrical circuit breaker assembly 100 at a connection point 12a. The electrical circuit breaker assembly 100 comprises an internal contactor device 120 (not shown in FIG. 1 but visible for example in FIG. 2) that makes it possible to connect the downstream point 10c of the electrical power supply line 10 to the connection point 12a of the earth conductor 12, and therefore consequently to the electrical earth 14 of the electrical circuit 1000, and also an internal severing device 110 (not shown in FIG. 1 but likewise visible for example in FIG. 2) that is capable of physically severing the electrical line 10 in a predetermined zone between the upstream 10*a* and downstream 10*c* points, so as to quickly open the electrical power supply line 10 electrically. Advantageously, it is thus possible to short-circuit the electrical power supply line 10 in the event of a fault occurring downstream of the electrical circuit breaker assembly 100, before disconnecting the electrical power supply line 10 from the rest of the electrical circuit 1000. This makes it possible to limit propagation of an overvoltage or an overcurrent to other elements of the electrical circuit 1000, in particular in the critical case of a highly inductive electrical line which is therefore likely to release a lot of energy when it is opened. Short-circuiting the line before opening makes it possible to make the performance of the electrical circuit breaker assembly 100 independent of the inductance value of the electrical power supply line 10. It is advantageously possible to reduce the energy to be dissipated in the electric arc produced by opening the electrical power supply line 10, and to decrease to zero the overvoltage across the inputs of the electrical circuit breaker assembly 100, and more broadly across all of the elements of the electrical circuit 1000.

The term "contactor" should be interpreted throughout the present description to mean a device that is configured to make irreversible contact between a point of the electrical power supply line 10 bearing the electrical circuit breaker device 100 and another point of the electrical circuit 1000 comprising the electrical power supply line 10. In the present case, the contactor device 120 is configured here to establish a direct electrical contact between the downstream point 10*c* of the electrical power supply line 10 and a point of the earth conductor 12 in the immediate vicinity of the downstream point 10*c*. In other words, the contactor device 120 acts as a contactor device but also as a diverter, configured and used to divert the energy present in the electrical power supply line 10 to the earth conductor 12 and therefore ultimately to the earth 14 of the electrical circuit 1000, after contact has been established between these elements.

According to one embodiment, the contactor device 120 and the line-severing device 110, both internal to the electrical circuit breaker assembly 100, are both configured such that they can be activated by pyrotechnic means that permit great responsiveness in the event of a fault appearing on the electrical power supply line 10.

The current control circuit 15 can operate by direct or indirect measurement. In the case of direct measurement, the current measured in the electrical power supply line 10 flows into the control device 15, which comprises a shunt resistor or a transistor. According to one variant, indirect measurement of the current in the electrical power supply line 10 is used and the control device 15 then comprises a galvanic isolation system between the electrical power supply line 10 and its internal measurement means. According to this variant, a parameter that is representative of the current established in the power supply line 10 is measured, such as, for example, the magnetic field induced by this current in a coil.

Figure 2:
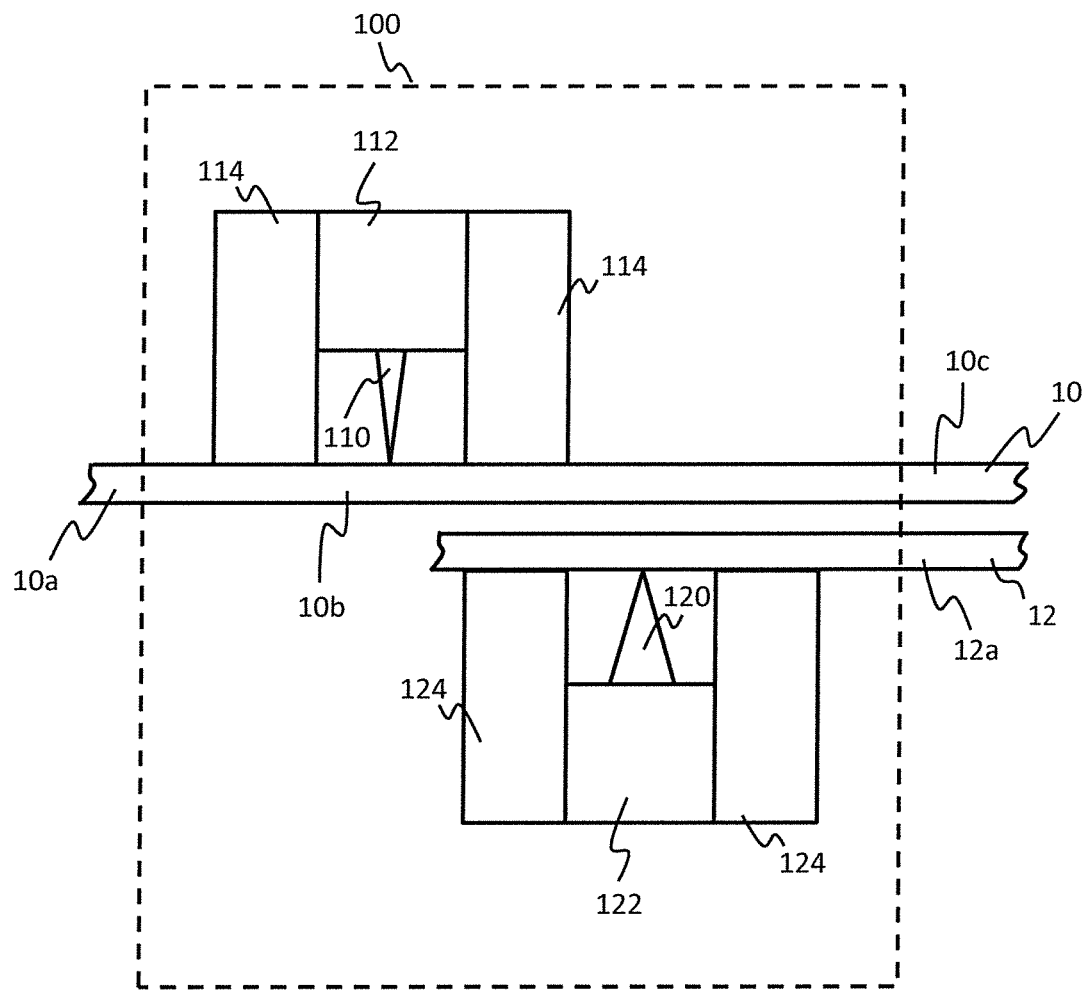
FIG. 2 schematically illustrates implementation details of the electrical circuit breaker assembly used in the electrical-circuit portion already shown in FIG. 1, before activation.

FIG. 2 schematically illustrates an implementation principle of the electrical circuit breaker assembly 100. The electrical circuit breaker assembly 100 comprises a conductive element, or conductor 10*b* which connects the upstream 10*a* and downstream 10*c* points of the electrical power supply line 10. The upstream 10*a* and downstream 10*c* points each advantageously comprise elements for electromechanical connection (not shown in the figure), such as, for example, a screw terminal, crimping means, or any equivalent configured for the series connection of the electrical circuit breaker assembly 100 on the electrical power supply line 10. A pyrotechnic circuit breaker is arranged opposite the conductor 10*b*. The pyrotechnic circuit breaker is mainly composed of the severing device 110 made from an insulating material and of a pyrotechnic element 112 housed in a body 114. This pyrotechnic circuit breaker can be activated by an exterior signal delivered by a control module. This signal, not shown in FIG. 2 for the sake of simplicity, is the activation signal 13 visible in FIG. 1. When the activation signal 13 is controlled such that it is in its active state, a pyrotechnic solution of the pyrotechnic element 112 is ignited so as to activate the severing device 110 moved by the displacement of a piston in a chamber of the body 114. When the severing device 110 is displaced following the ignition of the pyrotechnic element 112, the severing device 110 physically severs the conductor 10*b*, at a predetermined cut-off point, that is to say opposite the severing device 110, and in any case between the upstream point 10*a* and the downstream point 10*c* of the electrical power supply line 10. Although such an irreversible severing is very quick, that is to say, takes only a few milliseconds, the sudden opening of the electrical power supply line 10, which in essence is always relatively inductive, is of a nature to generate an electric arc which should be controlled as well as possible, as otherwise the efficiency and integrity of the electrical circuit breaker assembly 100 could be compromised. This is all the more true in the context of an aircraft, where pressure variations can occur around the electrical circuit breaker assembly 100 and inside the latter. Advantageously, and for the purposes of best achieving the desired quick opening of the electrical power supply line 10 by severing the conductor 10*b*, the contactor device 120 is used in the vicinity of the severing device 110. The contactor device 120 is arranged and configured to compress, or even crush, a portion of the earth conductor 12, connecting the circuit breaker assembly 100 to an earth 14 of the electrical circuit 100, so as to short-circuit the electrical power supply line 10. Such a short-circuit is achieved by connecting the downstream point 10*c* of the power supply line 10 to the earth conductor 12. To make the electrical contact, a contactor device 120, preferably made from a conductive material, is itself also cleverly moved by a pyrotechnic element 122, comprising a pyrotechnic solution. Advantageously and according to one preferred embodiment, the contactor device 120 is activated before the cut-off device 110 is activated. This ordering is achieved by igniting the pyrotechnic element 122 before igniting the pyrotechnic element 112. According to one embodiment of the invention, the delay between the two ignitions is set and calibrated when the electrical circuit breaker assembly 100 is manufactured. This delay may be determined by a control circuit designed to delay the activation signal of the pyrotechnic element 112 with respect to the activation signal of the pyrotechnic element 122. Of course, the severing device 110 and contactor device 120 are arranged such that the activation of one does not in any way compromise the integrity of the other prior to its activation. Typically, the severing device 110 comprises a severing point that is configured to make a cut along a section of the conductor 10*b*, in a cut-off chamber delimited by the body 124 comprising arranged ferromagnetic elements and means for controlling the speed of the piston in the combustion chamber, etc. The contactor device 120 operates according to a similar principle, except that the contactor device 120 is configured not to sever the conductor portion 12 arranged opposite it, but to compress, or even crush, this conductor portion onto the conductor 10b of the power supply line 10, and to consequently establish a sufficient electrical contact to short-circuit the electrical power supply line 10. The implementation details of the pyrotechnic elements 112 and 122, respectively arranged in the bodies 114 and 124, are not described any further here in so far as they are not useful for understanding the invention.

According to one implementation variant, the activation signals of the pyrotechnic elements 112 and 122 are distinct and controlled independently of one another. Advantageously, it is thus possible for an external activation controller, such as the control module 15 shown in FIG. 1, to define the predetermined delay between the two respective ignitions of the two pyrotechnic elements 112 and 122. According to this variant, two activation signals are then connected between the control module 15 and the electrical circuit breaker assembly 100.

Figure 3:
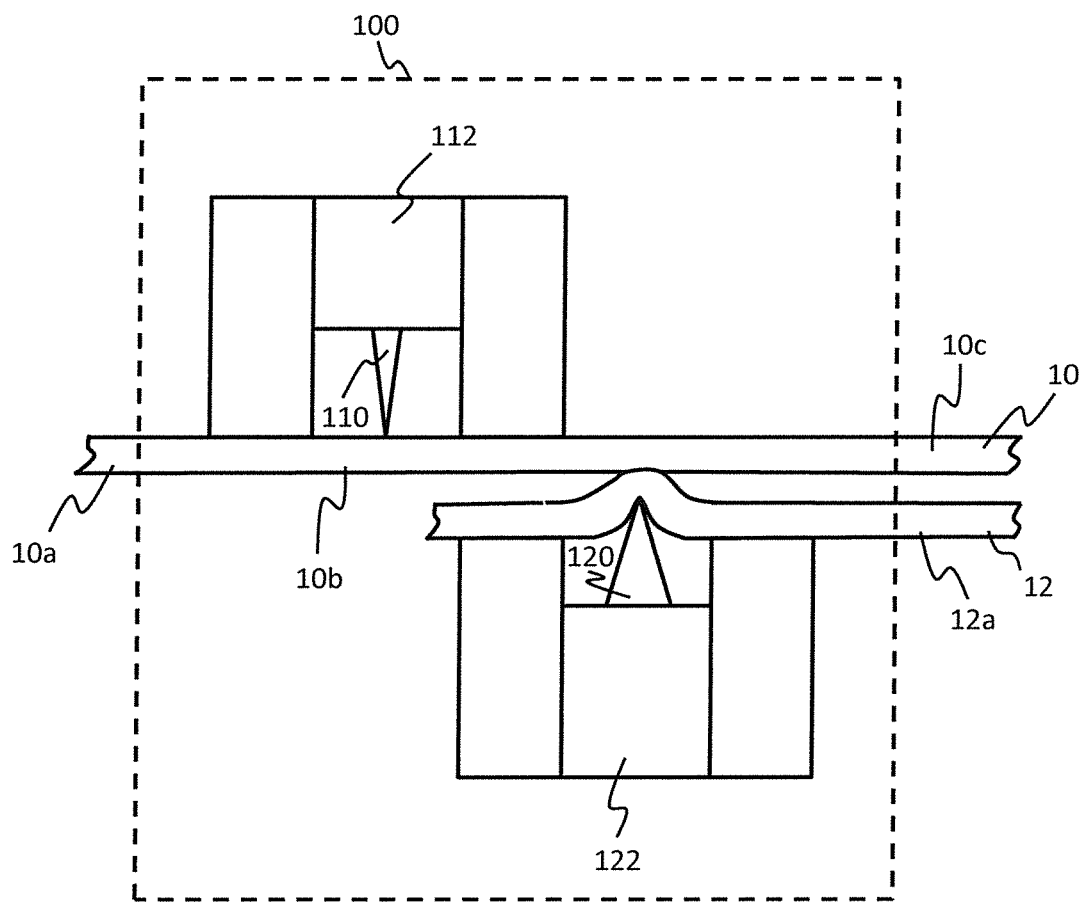
FIG. 3 schematically illustrates a state of the electrical circuit breaker assembly already shown in FIG. 2, after activation of a contactor device.

FIG. 3 illustrates a first internal state of the electrical circuit breaker assembly 100 after activation of the contactor device 120 and before activation of the severing device 110. The electrical contact established between the conductor 12 and the point 10c of the electrical power supply line 10 can be seen.

Figure 4:
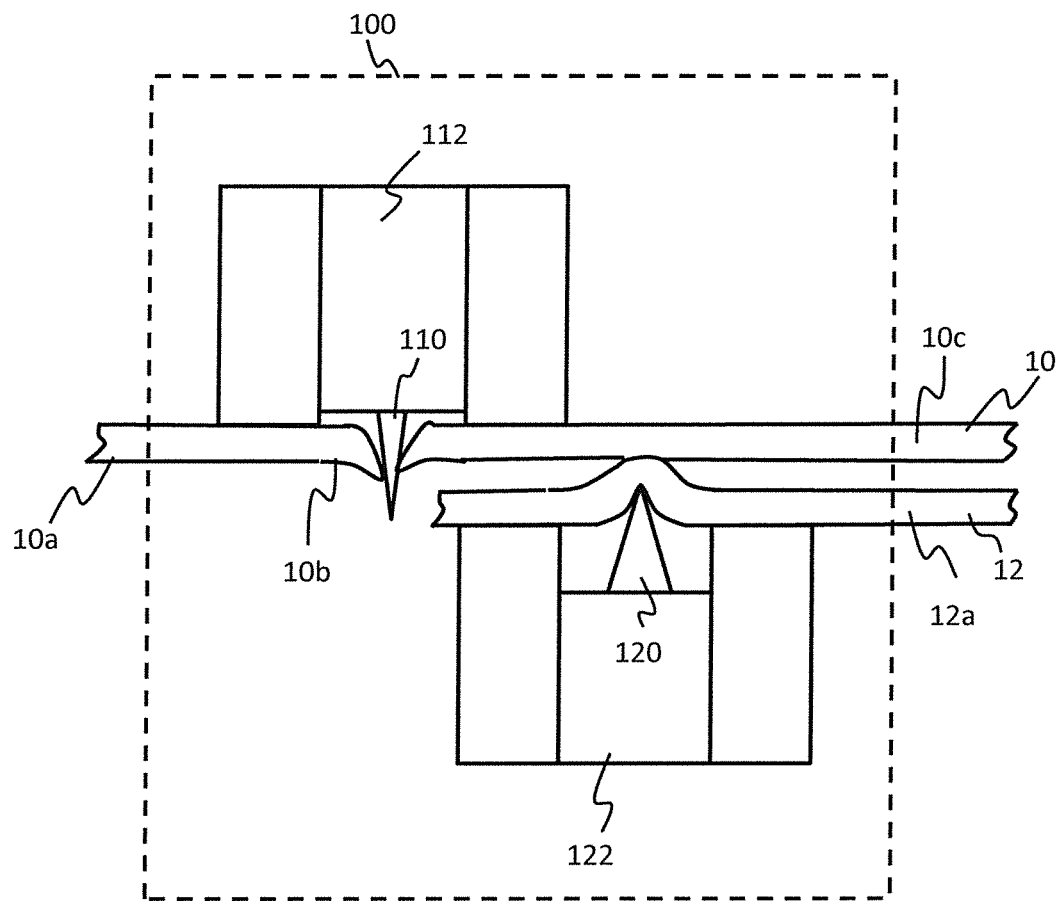
FIG. 4 schematically illustrates a state of the electrical circuit breaker assembly already shown in FIG. 3, after activation of a severing device.

FIG. 4 illustrates a second internal state of the electrical circuit breaker assembly 100 after activation of the contactor device 120 and after subsequent activation of the severing device 110. In addition to the electrical contact established between the conductor 12 and the point 10c of the electrical power supply line 10, the electrical opening of the power supply line 10 via physical severing of the conductor 10b opposite the severing device 110 can be seen.

Figure 5:
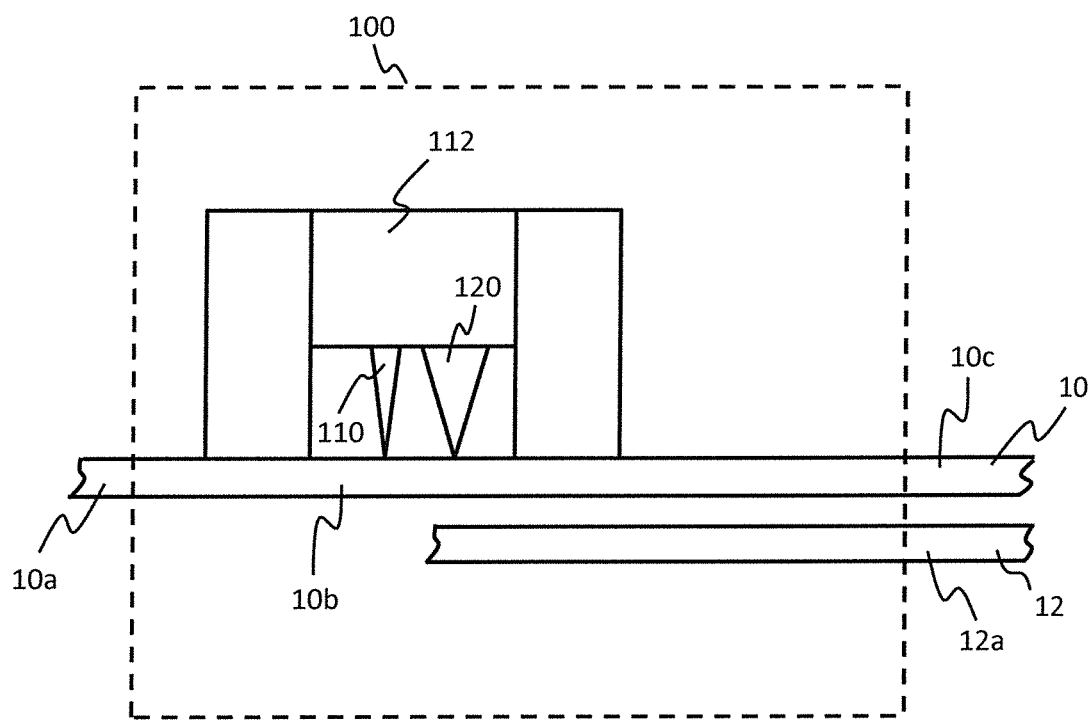
FIG. 5 schematically illustrates an implementation variant of the electrical circuit breaker assembly already shown in FIG. 2.

FIG. 5 schematically illustrates an implementation variant of the electrical circuit breaker assembly 100 according to which the severing device 110 and contactor device 120 are arranged in one single part or in two elements mounted integrally with each other, both moved by igniting just one single pyrotechnic element 112. Of course, according to this variant, just one activation signal is used to activate the short-circuit of the conductor 10b and of the earth conductor 12, and to activate the quick opening of the electrical power supply line 10, via physical severing of the conductor 10b. Although the structure of the circuit breaker assembly 100 is simplified thereby, this making the electrical circuit breaker assembly 100 easier and less expensive to manufacture, this variant makes it more complex to ensure the operations are carried out in order, i.e. the short-circuiting operation first, then the operation of opening of the electrical power supply line subsequently. As a matter of fact, only the mechanical arrangement of the severing device 110 and contactor device 120 makes it possible to create a short-circuit first then a severing, for example, if the contactor device 120 has a more consequential protruding shape than the severing device 110.

Figure 6:
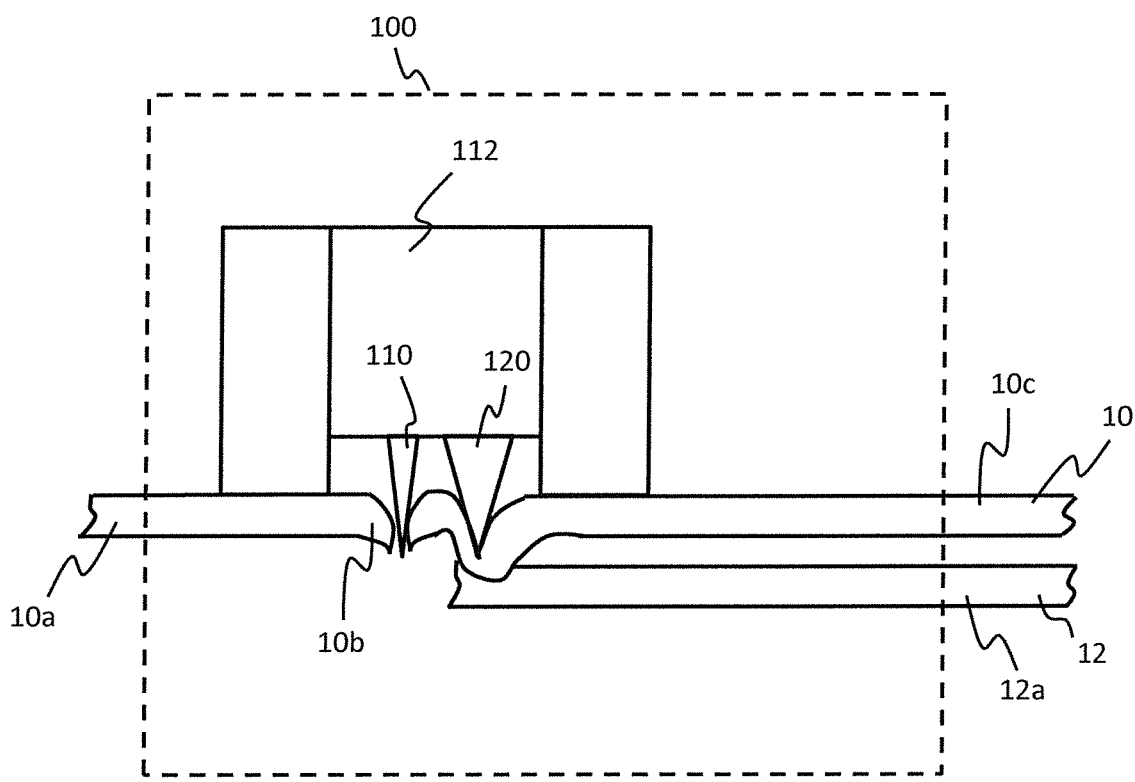
FIG. 6 schematically illustrates a state of the electrical circuit breaker assembly already shown in FIG. 5, after activation.

FIG. 6 schematically illustrates an internal state of the electrical circuit breaker assembly 100 after activation and in the implementation variant according to which the electrical circuit breaker 100 comprises just one pyrotechnic element 112. It is possible to see the contact established by the contactor device 120 between the conductor 10b and the conductor 12 by compression or crushing, and also the opening of the conductor 10b and therefore of the electrical power supply line 10 via a severing under the effect of the physical severing of the conductor 10b by the severing device 110, which is made from an insulating material. According to this variant, both devices, the severing device 110 and the contactor device 120, are made to move as a result of the ignition of one and the same pyrotechnic element 112.

Figure 7:
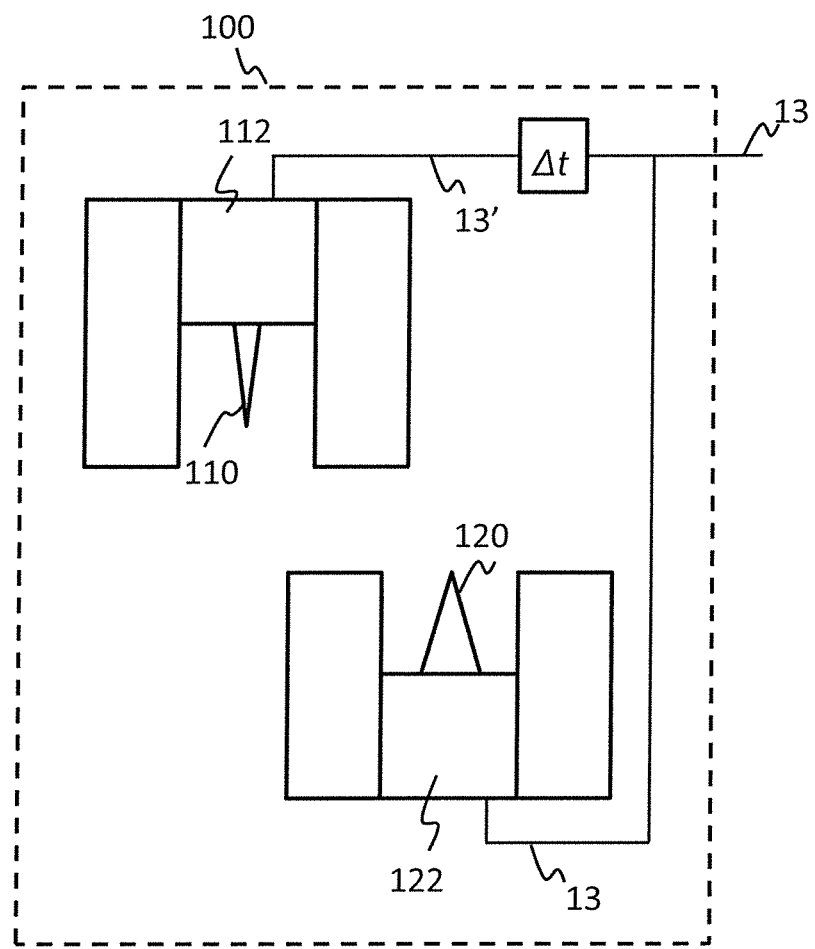
FIG. 7 schematically illustrates internal control circuits of the electrical circuit breaker assembly already shown in FIG. 2.

FIG. 7 schematically illustrates an internal activation circuit of the pyrotechnic elements 122 then 112 comprising a delay module $\Delta t$ making it possible to define a predetermined delay between the activation of the pyrotechnic element 122 and the subsequent activation of the pyrotechnic element 112. The delay module $\Delta t$ comprises a delay circuit that defines a propagation delay, for example using a combination of a resistive component and of a capacitive component. According to the embodiment shown, just one activation signal is used, which is delivered by an element external to the electrical circuit breaker assembly 100, such as the control and activation module 15 shown in FIG. 1.

Figure 8:
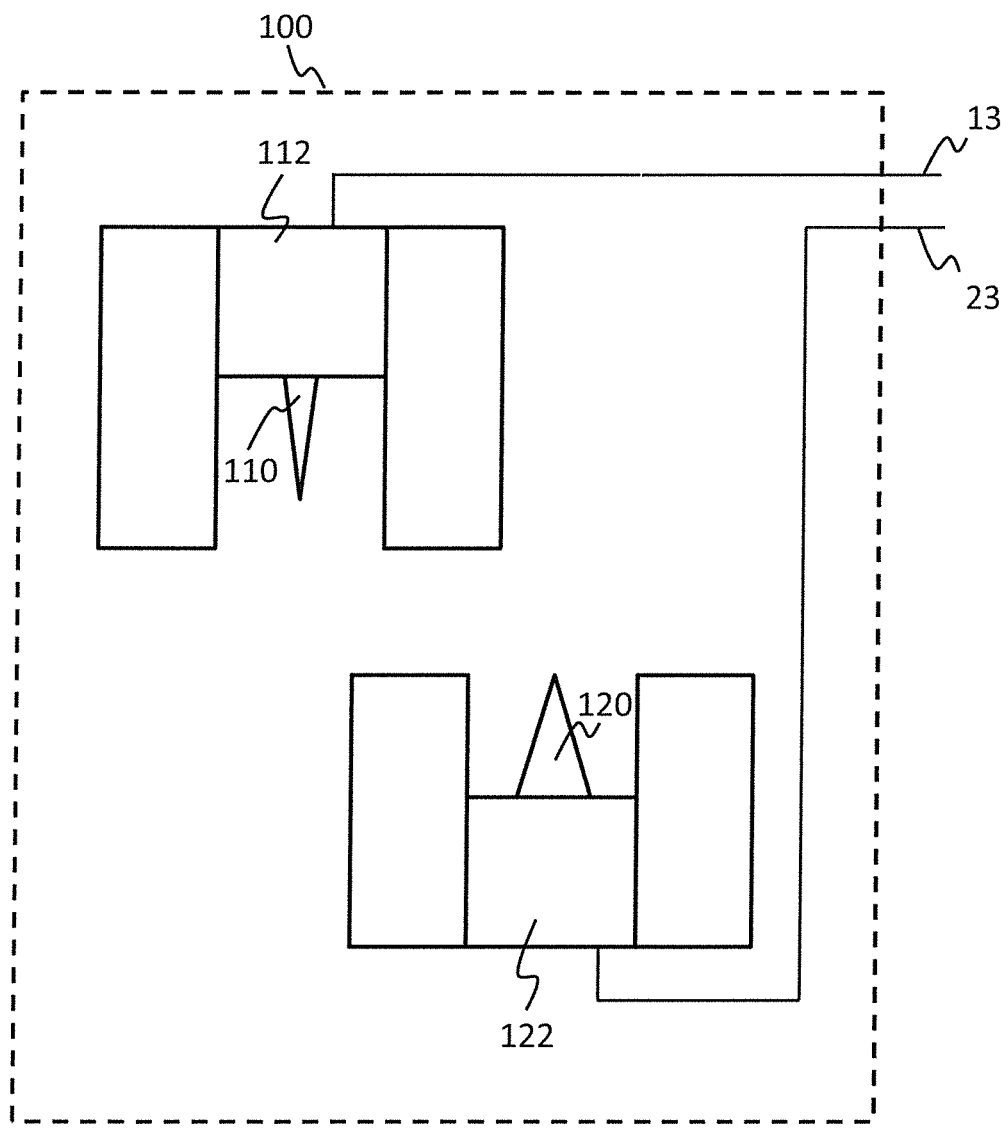
FIG. 8 schematically illustrates a variant of the internal control circuits of the electrical circuit breaker assembly already shown in FIG. 2.

FIG. 8 schematically illustrates an internal activation circuit of the pyrotechnic elements 122 then 112 without an internal delay module making it possible to define a predetermined delay between the activation of the pyrotechnic element 122 and the subsequent activation of the pyrotechnic element 112. According to this configuration, two independent activation signals 13 and 23 are connected between the control module 15 and the electrical circuit breaker assembly 100. According to this exemplary embodiment, the control module 15 defines the delay between the ignition of the pyrotechnic element 122 and the ignition of the pyrotechnic element 112. This delay can be set or determined according to a criterion, such as, for example, the electric potential measured by the control module 15 of the electrical power supply line 10, or else the current established in the electrical power supply line 10, measured by the control module 15.

Figure 9:
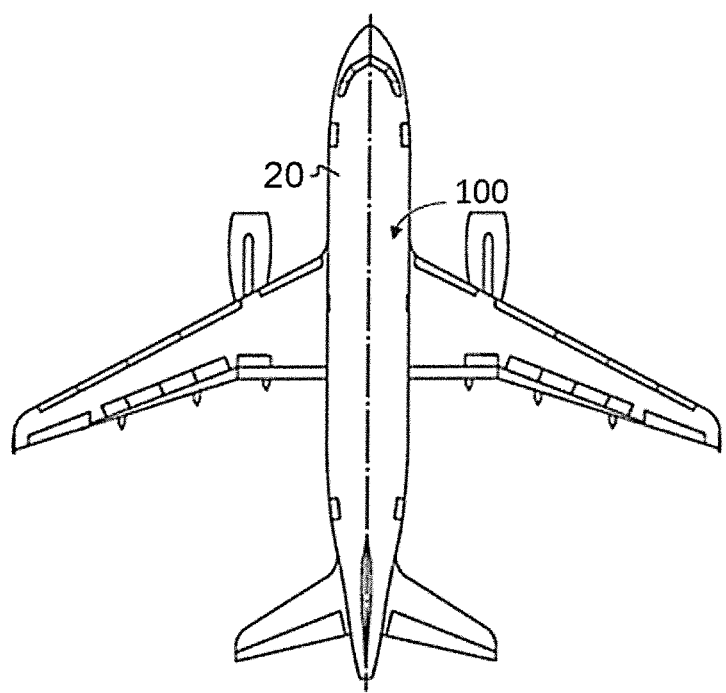
FIG. 9 schematically illustrates an aircraft comprising an electrical circuit breaker assembly according to one embodiment.

FIG. 9 illustrates an aircraft 20 comprising the electrical-circuit portion 1000 already described and at least one electrical circuit breaker assembly 100 implemented according to one of the embodiments previously described.

Advantageously, it is possible to quickly respond to a fault detected on the electrical line 10 of the aircraft 20 by virtue of the implementation of the electrical circuit breaker 100 and to isolate the electrical line 10 from the rest of the electrical circuit of the aircraft, quickly and while keeping electric arc phenomena under control in an improved manner.

The invention is not limited only to the embodiments and examples described hereinabove, but relates more generally to any electrical circuit breaker assembly comprising a device for severing an electrical power supply line as well as a contactor device configured to short-circuit a point of the electrical power supply line, downstream of the severing point, with earth or an earth conductor of the electrical circuit which comprises the electrical circuit breaker assembly.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical circuit breaker assembly comprising:
   a conductive element of an electrical circuit,
   a severing device configured to be activated by a first pyrotechnic element and that is configured to sever said conductive element in a predetermined cut-off zone delimited by a downstream point, and
   a contactor element configured to be activated by a second pyrotechnic element, the contactor element being configured to connect said downstream point of the cut-off zone to a ground conductor of said electrical circuit prior to a severing of said conductive element,
   wherein first and second activation signals of the first and second pyrotechnic elements, respectively, are distinct and controlled independently of one another.

2. An electrical protection system comprising a control module, an overcurrent detector and an electrical circuit breaker assembly according to claim 1.

3. An electrical circuit comprising an electrical circuit breaker assembly according to claim 1.

4. An electrical circuit comprising an electrical protection system according to claim 2.

5. An aircraft comprising an electrical circuit according to claim 3.

6. The aircraft according to claim 5 comprising at least one means of electric propulsion.

7. A method for protecting an electrical circuit of an aircraft, the electrical circuit comprising:
   a conductive element of a circuit,
   a severing device configured be activated by a first pyrotechnic element and that is configured to sever said conductive element in a predetermined cut-off zone delimited by a downstream point, and
   a contactor element configured to be activated by a second pyrotechnic element, the contactor element being configured to connect said downstream point of the cut-off zone to a ground conductor of said electrical circuit,
   wherein first and second activation signals of the first and second pyrotechnic elements, respectively, are distinct and controlled independently of one another,
   said method comprising steps of:
   (i) detecting a current that is representative of a current greater than a predetermined threshold established in said conductive element,
   (ii) connecting said downstream point of the cut-off zone to a ground conductor of said electrical circuit, and
   (iii) severing said conductive element in a predetermined cut-off zone,
   wherein step (iii) of severing said conductive element occurs after step (ii) of connecting said downstream point of the cut-off zone to said ground conductor of said electrical circuit.

* * * * *